(12) United States Patent
Ichihashi (10) Patent No.: US 9,140,175 B2
(45) Date of Patent: Sep. 22, 2015

(54) ENGINE AND ENGINE-OPERATED WORKING MACHINE

(75) Inventor: Naoto Ichihashi, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 0 days.

(21) Appl. No.: 14/239,499

(22) PCT Filed: Aug. 29, 2012

(86) PCT No.: PCT/JP2012/072533
§ 371 (c)(1),
(2), (4) Date: Feb. 18, 2014

(87) PCT Pub. No.: WO2013/042535
PCT Pub. Date: Mar. 28, 2013

(65) Prior Publication Data
US 2014/0216370 A1    Aug. 7, 2014

(30) Foreign Application Priority Data

Sep. 21, 2011    (JP) .................................. 2011-206674

(51) Int. Cl.
| | |
|---|---|
| *F02F 1/34* | (2006.01) |
| *F01P 5/04* | (2006.01) |
| *F01N 13/00* | (2010.01) |
| *F01N 3/04* | (2006.01) |
| *F01N 3/05* | (2006.01) |
| *H02K 9/06* | (2006.01) |

(52) U.S. Cl.
CPC . *F01P 5/04* (2013.01); *F01N 3/046* (2013.01); *F01N 3/055* (2013.01); *F01N 13/002* (2013.01); *H02K 9/06* (2013.01); *F01N 2590/06* (2013.01); *Y02T 10/20* (2013.01)

(58) Field of Classification Search
USPC ........................ 123/41.7, 41.62, 41.65, 41.69
See application file for complete search history.

(56) References Cited

U.S. PATENT DOCUMENTS

| | | | | |
|---|---|---|---|---|
| 4,370,855 | A | * | 2/1983 | Tuggle ............................ 60/317 |
| 4,741,411 | A | | 5/1988 | Stricker |
| 5,269,665 | A | | 12/1993 | Sadler et al. |

(Continued)

FOREIGN PATENT DOCUMENTS

| | | | |
|---|---|---|---|
| EP | 0 931 915 A2 | 7/1999 | |
| JP | 2003-129840 A | 5/2003 | |
| JP | 2003148124 A * | 5/2003 | ............... F01P 5/06 |

OTHER PUBLICATIONS

International Search Report and Written Opinion of the International Search Report for PCT/JP2012/072533 dated Dec. 12, 2012.

*Primary Examiner* — Hung Q Nguyen
(74) *Attorney, Agent, or Firm* — Kenealy Vaidya LLP (57) ABSTRACT

In an engine including a cooling fan provided at one end of a drive shaft to cool the engine, a muffler is attached such that a longitudinal direction thereof coincide with a direction of gravity, and a muffler accommodating chamber is formed by a muffler cover. A portion of cooling air generated by the cooling fan is introduced into the muffler accommodating chamber so as to cool the muffler. At the muffler accommodating chamber, a cooling air outlet is provided at an upper end of a cooling passage, such that the waste heat of the muffler is discharged from the cooling air outlet to the outside during the stop of the engine. A cooling air inlet is disposed below the cooling air outlet such that the cooling air flows from the lower side to the upper side of the muffler.

12 Claims, 9 Drawing Sheets

(56) References Cited

U.S. PATENT DOCUMENTS

| | | | |
|---|---|---|---|
| 5,722,237 A * | 3/1998 | Iida et al. | 60/302 |
| 6,039,020 A * | 3/2000 | Kawamoto et al. | 123/196 R |
| 8,210,134 B2 * | 7/2012 | Shimokawa | 123/41.7 |
| 2003/0057016 A1 * | 3/2003 | Schlossarczyk et al. | 181/283 |
| 2003/0192493 A1 * | 10/2003 | Yuasa et al. | 123/73 PP |
| 2010/0011754 A1 * | 1/2010 | Kiesewetter et al. | 60/321 |

* cited by examiner

ENGINE AND ENGINE-OPERATED WORKING MACHINE

This application is a U.S. national phase filing under 35 U.S.C. §371 of PCT Application No. PCT/JP2012/072533, filed Aug. 29, 2012, and which in turn claims priority under 35 U.S.C. §119 to Japanese Patent Application No. 2011-206674 filed Sep. 21, 2011, the entireties of which are incorporated by reference herein.

TECHNICAL FIELD

The present invention relates to an engine which is mainly used as a power source of a portable working machine such as a bush cutter and a blower, and an engine-operated working machine using the engine.

BACKGROUND ART

In mufflers and engines used as power sources of portable working machines such as a bush cutter and a blower, a so-called forced air cooling type of performing cooling with cooling air by a cooling fan attached to one end of a drive shaft is widely used. In order to prevent workers from abruptly coming into contact with muffler portions, a muffler cover is often provided to cover almost the whole of the muffler. In this case, rises in the temperatures of the muffler and the muffler cover become a problem. In the related art, in order to avoid the temperature rise problem, a gap between the muffler and the muffler cover are set as large as possible. However, in this case, the size of the muffler cover increases. In order to solve this problem, it is effective to efficiently cool the muffler during operation of the engine, and make it difficult for heat of the muffler to be transferred to the muffler cover. For example, in PTL 1, a heat shield plate is disposed above a muffler, and a portion of cooling air of a cylinder is introduced into the muffler cover. By virtue of the heat shield plate, PTL 1 enables cooling the muffler while suppressing the heat of the muffler from being transferred to the muffler cover.

CITATION LIST

Patent Literature

PTL 1: JP-A-2003-129840

SUMMARY OF INVENTION

Technical Problem

In cooling the muffler, PTL 1 does not mention a method of making a flow of cooling air for more efficiently cooling the muffler. Also, since air for cooling the muffler is a portion of air having cooled the cylinder, the air for cooling the muffler is warm air heated by the cylinder, and thus the cooling effect may not be sufficient. Further, since a cooling air inlet is positioned at an upper end of a muffler cooling passage, in air cooling during stop of an engine, high-temperature updraft may flow back into the cooling air inlet to heat accessories (components) such as an ignition coil disposed inside the cylinder or a cylinder cooling air passage.

The present invention was made in view of the above-described background, and an object of the present invention is to provide an engine and an engine-operated working machine capable of effectively cooling a muffler by exposing the muffler directly to low-temperature cooling air.

Another object of the present invention is to provide an engine and an engine-operated working machine configured such that it is possible to efficiently make cooling air flow into a muffler accommodating chamber which accommodates the whole of a muffler.

A further object of the present invention is to provide an engine and engine-operated working machine capable of protecting accessories of the engine and a muffler cover from waste heat of a muffler during stop of the engine.

Solution to Problem

Illustrative aspects of the present invention will be described as follows.

According to a first illustrative aspect of the present invention, there is provided an engine comprising: a cylinder having a plurality of fins at an outer circumference thereof and forming a combustion chamber; a cooling fan, which is provided at one end of a drive shaft, and which is configured to cool the cylinder; a muffler attached to an exhaust port of the cylinder; and a muffler cover, which covers the muffler, and which forms a muffler accommodating chamber, wherein the muffler cover comprises a cooling air inlet and a cooling air outlet, and a part of cooling air generated by the cooling fan is introduced from the cooling air inlet into the muffler accommodating chamber so as to cool the muffler, wherein: the engine comprises a heat shield plate interposed between the muffler and the muffler cover; and the heat shield plate is provided with an opening formed at a position overlapping the cooling air inlet so as to introduce the cooling air from the cooling air inlet and to flow the cooling air between the muffler and the heat shield plate. According to a second illustrative aspect of the present invention, the cooling air outlet is provided in a vicinity of an upper end of the muffler accommodating chamber such that a flow of natural air cooling during stop of the engine is configured to be discharged from the cooling air outlet to an outside, and the cooling air inlet is disposed below the cooling air outlet.

According to a third illustrative aspect of the present invention, the cooling air outlet is provided in a vicinity of an upper end of the muffler accommodating chamber, and the cooling air inlet is provided to the muffler accommodating chamber at a position diagonally to the cooling air outlet and is configured to allow the part of the cooling air introduced into the muffler accommodating chamber to cool the lower portion of the muffler and to flow to the cooling air outlet. According to a fourth illustrative aspect of the present invention, the engine further comprises: a fan cover that covers the cooling fan, wherein the fan cover is configured to form a guiding passage for guiding the cooling air to the muffler accommodating chamber. According to a fifth illustrative aspect of the present invention, the heat shield plate is provided between the muffler and the cylinder and has an area larger than that of a side portion of the muffler facing the cylinder.

According to a sixth illustrative aspect of the present invention, the heat shield plate comprises a top wall portion that extends to be interposed between a top wall portion of the muffler and a top wall portion of the muffler cover; and the top wall portion of the heat shield plate is configured to guide the cooling air reaching an upper side of the cooling passage to the cooling air outlet. According to a seventh illustrative aspect of the present invention, the heat shield plate comprises a bottom wall portion that extends to be interposed between a bottom wall portion of the muffler and a bottom wall portion of the muffler cover, and the bottom wall portion of the heat shield plate is configured to guide the cooling air flowing at a lower side of the cooling passage to the cooling air outlet. According to an eighth illustrative aspect of the present invention, the muffler cover is configured such that the cooling air outlet becomes a single opening at a wall portion of the muffler accommodating chamber where the cooling air outlet is positioned. According to a ninth illustrative aspect of the present invention, the top wall portion and the bottom wall portion of the heat shield plate are configured to abut on an inner wall of the muffler cover. According to a tenth illustrative aspect of the present invention, there is provided an engine-operated working machine comprising the engine according to any one of the above illustrative aspects.

Advantageous Effects of Invention

According to the first illustrative aspect, the heat shield plate having the opening at the position overlapping the cooling air inlet is interposed between the muffler and the muffler cover, such that the cooling air introduced from the cooling air inlet flows between the muffler and the heat shield plate. Therefore, during forced air cooling (when the cooling fan is rotating such that the cooling air is introduced), it is possible to make the cooling air flow in a wide range from the cooling air inlet to the cooling air outlet. According thereto, it is possible to improve the muffler cooling performance.

According to the second illustrative aspect, the cooling air outlet is disposed at the upper end of the cooling passage, and the cooling air inlet is disposed below the cooling air inlet. Therefore, during natural air cooling (when the cooling fan is at a stop), it is possible to quickly guide high-temperature updraft reaching the upper end of the cooling passage, to the cooling air outlet. Thus, it can be possible to prevent the heat from staying at the upper end portion of the cooling passage, and it is possible to reduce a rise in the temperature of the muffler cover. Also, when the muffler is attached such that the longitudinal direction of the muffler coincides with the direction of gravity, the high-temperature updraft rarely flows from the cooling air inlet provided below the cooling air outlet, back into the engine. Therefore, it is possible to significantly improve the efficiency of natural air cooling.

According to the third illustrative aspect, the cooling air inlet is disposed at the muffler accommodating chamber, diagonally to the cooling air outlet, such that at least a portion of the cooling air introduced into the muffler accommodating chamber cools the lower portion of the muffler and flows to the cooling air outlet. Therefore, it is possible to effectively cool the wide wall surface of the muffler.

According to fourth illustrative aspect, the fan cover is provided to cover the cooling fan, and the guiding passage for guiding the cooling air to the muffler accommodating chamber is formed by the fan cover. Therefore, it is possible to surely make the cooling air flow to the cooling air inlet of the muffler accommodating chamber. According thereto, it is possible to improve the muffler cooling effect.

According to the fifth illustrative aspect, the heat shield plate for suppressing heat transfer is provided between the muffler and the cylinder. Therefore, it is possible to effectively prevent the waste heat of the muffler from being transferred to the cylinder side during the stop of the engine.

According to the sixth illustrative aspect, the heat shield plate includes the top wall portion that extends to be interposed between the top wall portion of the muffler and the top wall portion of the muffler cover. Therefore, it is possible to surely guide the cooling air such that the cooling air flows to the upper side where the cooling air outlet is positioned. Further, it is possible to prevent high-temperature cooling air having cooled the muffler during the forced air cooling and high-temperature updraft during the natural air cooling from coming into direct contact with the top wall portion of the muffler cover. According thereto, it is possible to significantly reduce a rise in the temperature of the muffler cover.

According to the seventh illustrative aspect, the heat shield plate includes the bottom wall portion, which extends to be interposed between the bottom wall portion of the muffler and the bottom wall portion of the muffler cover, and guides the cooling air flowing at the lower side of the cooling passage, to the cooling air outlet. Therefore, it is possible to surely guide the cooling air having flowed at the lower side of the muffler, to the cooling air outlet.

According to the eight illustrative aspect, the muffler cover is formed such that the cooling air outlet becomes a single opening at the wall portion of the muffler accommodating chamber where the cooling air outlet is positioned. Therefore, it is possible to effectively exhaust the muffler cooling air together with exhaust fumes to the outside.

According to the ninth illustrative aspect, the heat shield plate is provided such that the top wall portion and the bottom wall portion of the heat shield plate about on the inner wall of the muffler cover. Therefore, it is possible to make a smooth flow of the cooling air in the muffler accommodating chamber, and to improve the muffler cooling effect.

According to the tenth illustrative aspect, since the engine-operated working machine includes an engine having any one of the above-described configurations, it is possible to implement a user-friendly engine-operated working machine preventing a muffler cover from being overheated.

The above and other objects and new features of the present invention will become apparent from the following description of this specification and the drawings.

DESCRIPTION OF EMBODIMENTS

First Embodiment

Figure 1:
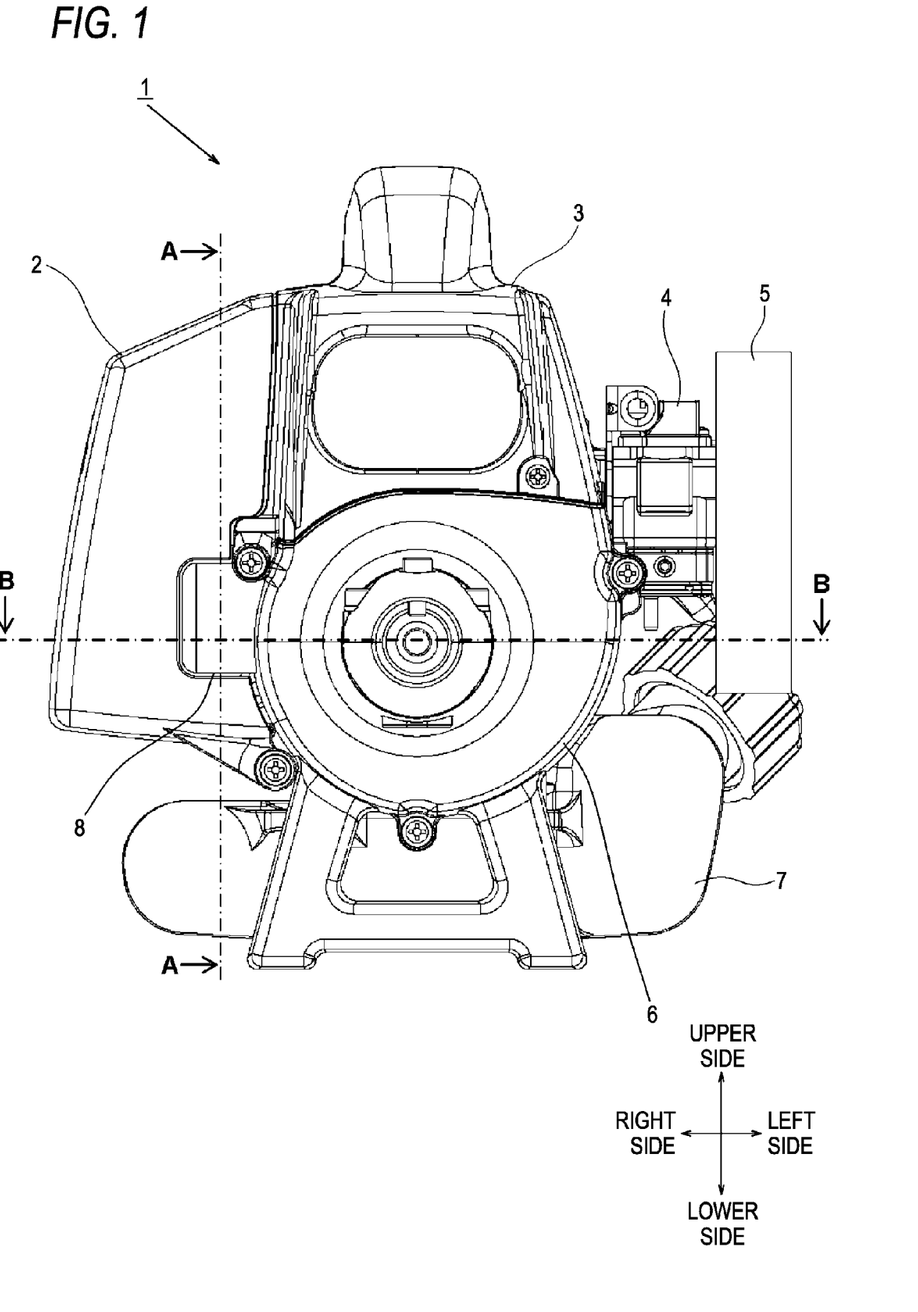
FIG. 1 is a front view illustrating an engine according to an embodiment of the present invention.

Hereinafter, embodiments of the present invention will be described with reference to the accompanying drawings. Throughout the drawings, identical portions are denoted by the same reference symbols, and the repeated description thereof will be omitted. In this specification, a front side, a rear side, a left side, a right side, an upper side, and a lower side will be described with reference to directions shown in the drawings. FIG. 1 is a front view illustrating an engine 1 according to an embodiment of the present invention.

The engine 1 is a small air-cooled two-stroke engine, and is used as a drive source of an engine-operated working machine such as a bush cutter. The engine 1 includes a carburetor 4 and an air cleaner 5 provided on the inlet side, a muffler 9 provided on the outlet side, and a muffler cover 2 for converting the muffler 9. A fuel tank 7 is disposed at a lower side of the engine 1. After fuel is supplied from the fuel tank 7 to the carburetor 4, a mixture of air cleaned by the air cleaner 5 and the fuel is generated by the carburetor 4, and the generated mixture is drawn into a cylinder of the engine 1. The engine 1 is a known two-stroke engine, where the cylinder is attached above a crankcase and one piston reciprocates in the vertical direction (e.g., perpendicular direction) in the cylinder, whereby a drive shaft (crankshaft) rotates. The cycle of drawing, compression, an explosion, and discharging according to the reciprocation of the piston is a known operation, and thus will not be described in detail here. At one end of the drive shaft of the engine 1, a cooling fan (which will be described later) is provided. Cooling air generated by the cooling fan flows in an engine cooling air passage formed by a fan case 6 and a cylinder cover 3, thereby forcedly cooling a heat generating portion of the engine 1. Also, in the present embodiment, the shape of a portion of the fan case 6 is modified to introduce a portion of the cooling air generated by the cooling fan into inside of the muffler cover 2 (a cooling passage which will be described later) such that the portion of the cooling air is used to forcedly cool the muffler 9. To this end, a cooling-air introducing passage 8 is provided at the fan case 6, such that a portion of the cooling air generated by the cooling fan is introduced into an internal space of the muffler cover 2 through the cooling-air introducing passage 8.

Figure 2:
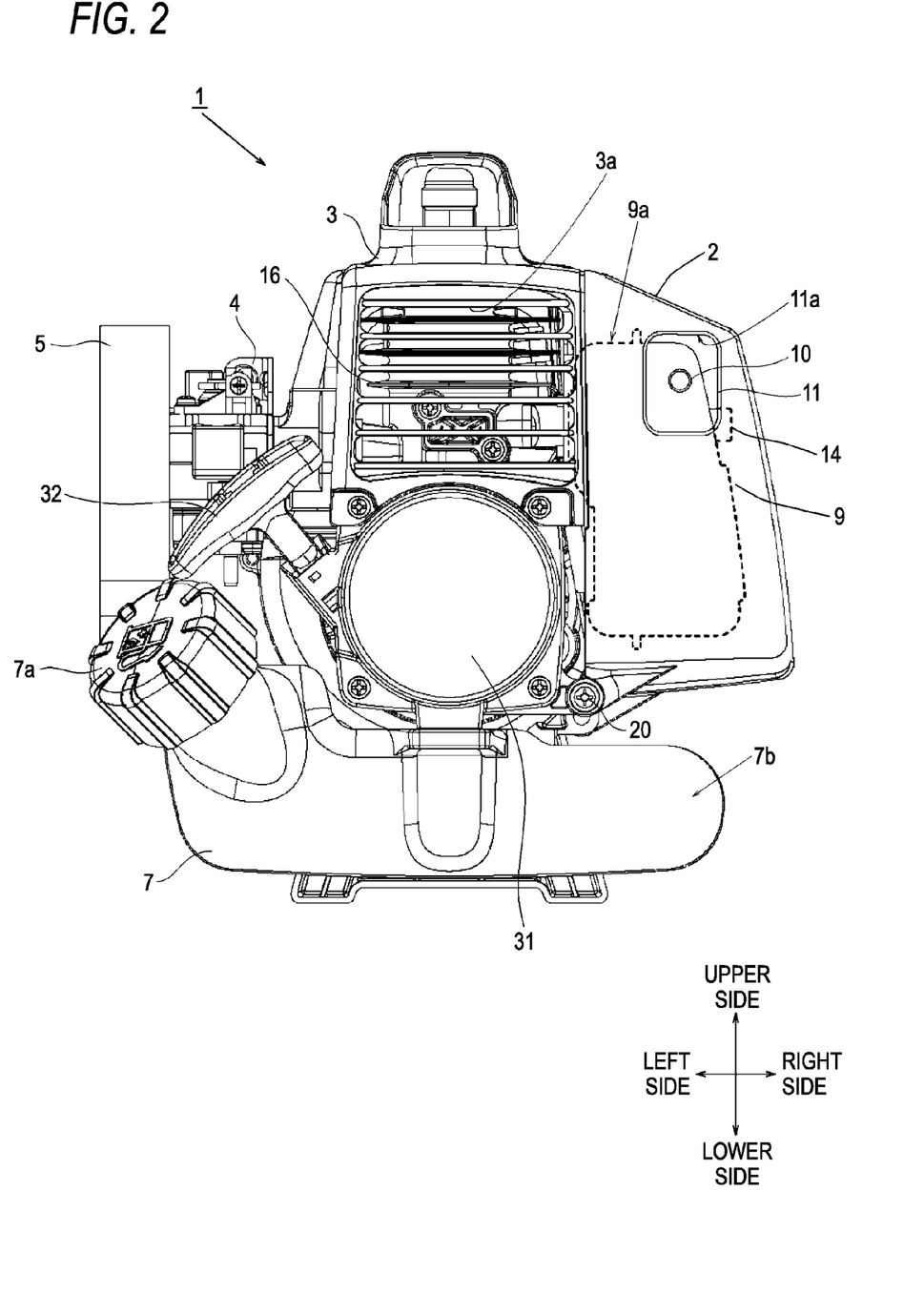
FIG. 2 is a rear view illustrating the engine according to the embodiment of the present invention.

FIG. 2 is a rear view illustrating the engine 1 according to the embodiment of the present invention. To an exhaust port (not shown) at a side of the engine 1, the muffler 9 as shown by a dotted line in FIG. 2 is attached. The muffler cover 2 is attached from a side of the cylinder cover 3 to cover almost the whole of the muffler 9, thereby guarding a worker such that the worker is prevented from coming into direct contact with the muffler 9 by virtue of the muffler cover 2. At the rear of the cylinder cover, a plurality of slit-lie openings 3a is provided. Air generated by the cooling fan cools a cylinder 16 and then is exhausted to the outside through the openings 3a. Below the slit-like openings 3a, a starter 31 is attached coaxially with an output shaft of the engine 1. The starter 31 is a manual starter which connects a reel for winding up a traction cord to the output shaft (crankshaft) of the engine and is configured to start the engine when the traction cord is pulled by a knob 32. Although the inner structure of the starter 31 is not shown in FIG. 2, as the starter 31, not only a manual starter but also arbitrary starting devices such as a starting device using a recoil starter and a starting device which drives an electric motor by a battery can be used.

The fuel tank 7 is a container which is made of a translucent polymer resin. When a cap 7a attached to an opening of the fuel tank 7 is removed, it is possible to provide blended fuel obtained by blending gasoline and oil in a predetermined ratio. In the present embodiment, in order to prevent the overall height of the engine 1 from increasing, the fuel tank 7 has a flat shape horizontally extending and is configured such that the vicinity of a portion 7b of the fuel tank extends up to the lower side of the muffler 9. Incidentally, the shape of the fuel tank 7 may be arbitrary. The shape of the fuel tank may be appropriately set according to the shapes of the muffler 9 and the air cleaner 5 and so on.

The muffler cover 2 can be made of a polymer resin such as plastic by integral molding, like the cylinder cover 3 or the fan case 6. The muffler cover 2 is fixed to the cylinder cover 3 by a plurality of screws 20 (only one screw is shown in FIG. 2). The muffler 9 used in the present embodiment has an elongated and almost cuboid shape and is attached to the vicinity of the exhaust port of the cylinder by a fastening bolt 14 such that a longitudinal direction thereof coincides with the vertical direction, that is, the direction of gravity. At the upper portion of the muffler 9, an exhaust fume outlet 10 is provided, and exhaust fumes exhausted from the exhaust fume outlet 10 is discharged toward the rear side of the engine 1.

At a position of the muffler cover 2 corresponding to the exhaust fume outlet 10 of the muffler 9, a cooling air outlet 11 is provided. The cooling air outlet 11 is substantially rectangular as seen from the rear side. The cooling air outlet 11 has an opening area that is sufficiently larger than the diameter of the circular exhaust fume outlet 10. This opening area is arbitrarily set. Preferably, the opening area may be sufficiently large such that, even if the exhaust fumes exhausted from the exhaust fume outlet 10 (which generally has an protruding tube-like shape) flows in a spread state after the exhaust, the exhaust fumes do not come into contact with the edge portion of the cooling air outlet 11, and it is possible to efficiently exhaust not only the exhaust fumes but also cooling air of the muffler (which will be described later). As can be understood from FIG. 2, on the rear wall side of the muffler cover 2, the cooling air outlet 11 is a single opening, and there is substantially no other opening at the other portion of a rear wall portion of the muffler cover 2. The upper end position of the cooling air outlet 11 is preferably disposed above the position of a top wall portion 9a of the muffler 9.

Figure 3:
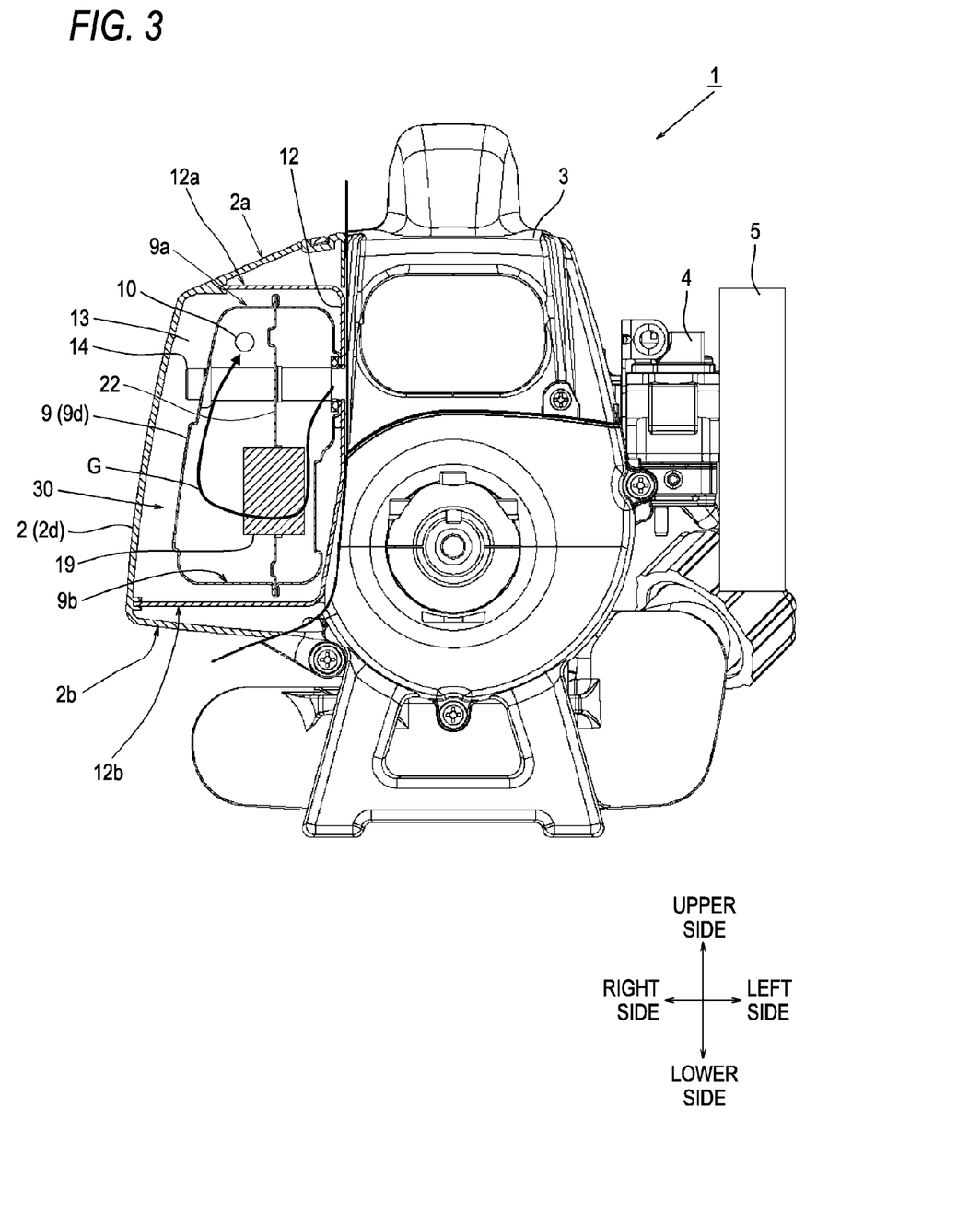
FIG. 3 is a front view illustrating the engine according to the embodiment of the present invention with a longitudinal section of a muffler portion.

FIG. 3 is a front view illustrating the engine 1 according to the embodiment of the present invention with a section of the muffler portion. The muffler 9 is attached to the cylinder 16 (or the crankcase) by the fastening bolt 14, with the heat shield plate 12 interposed therebetween. The muffler cover 2 has a muffler accommodating chamber 30 formed therein to completely cover not only the muffler 9 and the heat shield plate 12. The muffler accommodating chamber 30 is separated from an engine-side cooling air passage by the heat shield plate 12. A cylinder-side cooling air passage of the engine 1 is configured by the cylinder cover 3. The cylinder cover 3 has a plurality of ventilator windows. A top wall portion 12a of the heat shield plate 12 is interposed between a top wall portion 2a of the muffler cover 2 and a top wall portion 9a of the muffler 9, so as to divide a space between the muffler cover 2 and the muffler 9 into two spaces, such that it is difficult for heat of the muffler 9 to be transferred to the muffler cover 2.

Similarly, a bottom wall portion 12b of the heat shield plate 12 is interposed between a bottom wall portion 2b of the muffler cover 2 and a bottom wall portion 9b of the muffler 9. As a result, the space between the muffler cover 2 and the muffler 9 is divided into two spaces, such that the cooling air smoothly flows on the outer wall portion of the muffler 9. Here, the end portions of the top wall portion 12a and the bottom wall portion 12b of the heat shield plate 12 abut on an inner wall of the muffler cover 2. To this end, the inner periphery of the muffler cover 2 has grooves for fitting the edge portions of the heat shield plate 12. Accordingly, inside the muffler accommodating chamber 30, each gap between the muffler 9 and the muffler cover 2, between the muffler 9 and the top wall portion 12a of the heat shield plate 12 and between the muffler 9 and the bottom wall portion 12b of the heat shield plate 12 is formed as a cooling passage 13.

The muffler 9 is basically substantially cuboid. The muffler 9 is disposed such that a longitudinal direction thereof is oriented in the perpendicular direction (vertical direction). This is because the muffler 9 has been extended in the vertical direction in order to effectively exhaust sound in a limited space such that the capacity of the muffler 9 is secured as large as possible. Inside the muffler 9, a partition plate 22 is provided to define a first expansion chamber formed on the cylinder side of the engine 1 and a second expansion chamber formed on the side separated from the cylinder and having the exhaust fume outlet 10. At the partition plate 22 separating the first expansion chamber and the second expansion chamber, a catalyst 19 is disposed for cleaning exhaust fume components. The components of exhaust fumes G discharged by the engine are cleaned in the muffler 9 by the catalyst 19, and then the exhaust fumes G are discharged from the exhaust fume outlet 10 into atmosphere. Due to the exhaust fumes G, the temperature of the muffler 9 rises (e.g., the muffler 9 is heated due to the exhaust fumes G).

The catalyst 19 is formed, for example, by inserting honeycomb-like stainless foil made of palladium, rhodium, or the like by vapor deposition, into a stainless cylinder, and fixing the stainless foil to the inside of the stainless cylinder. The catalyst 19 is an oxidation catalyst for oxidizing HC, CO, and the like. The exhaust fumes flow in a direction shown by an arrow G, enter the first expansion chamber from the cylinder side, pass the catalyst 19, flow into the second expansion chamber, and are exhausted from the exhaust fume outlet 10. By disposing the catalyst 19 separately from the cylinder of the engine 1 which is a heat source as described above, it is possible to prevent the heat source from concentrating on one area, and to suppress a heterogeneous temperature rise of the muffler 9. Here, an outer wall portion 9d of the muffler 9 is exposed to the exhaust fumes heated to a high temperature by passing the catalyst 19, so that the outer wall portion 9d may be particularly heated to a high temperature. However, since a relatively large distance between the outer wall portion 9d and a right wall portion 2d of the muffler cover 2 is secured, by flowing the cooling air (which will be described later) in this space (e.g., cooling passage 13), it becomes possible to forcedly cool the outer wall portion 9d of the muffler 9.

Figure 4:
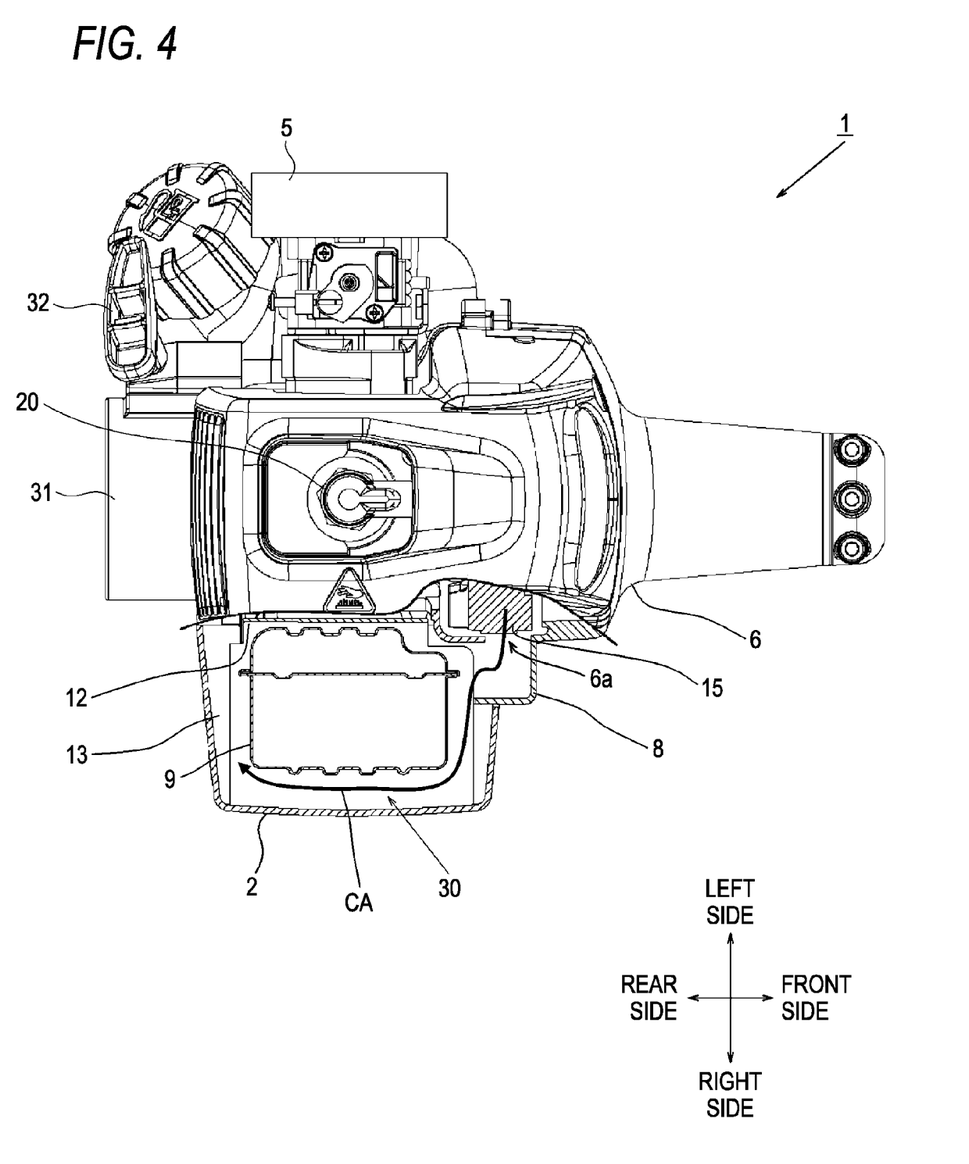
FIG. 4 is a top view illustrating the engine according the first embodiment of the present invention, with a section taken along a line B-B of FIG. 1, and this section shows a flow of cooling air into a muffler accommodating chamber.

FIG. 4 is a top view illustrating the engine 1 according to the first embodiment of the present invention with a section taken along a line B-B of FIG. 1, and this section shows a flow of the cooling air into the muffler accommodating chamber 30. To one side (front side) of the crankshaft of the engine 1, one end portion of the drive shaft (not shown) is joined through a centrifugal clutch mechanism (not shown). If the rotating speed of the crankshaft (not shown) becomes a predetermined speed or more, a centrifugal clutch disposed inside the fan case 6 becomes an engaged state by a centrifugal force. Therefore, the centrifugal clutch mainly includes a centrifugal swing element attached to the flywheel side, and a cup-like clutch drum accommodating the swing element and connected to the drive shaft side. The flywheel positioned between the centrifugal clutch and the crankcase is formed integrally with a cooling fan 15 configured to generate cooling air to forcedly cool the engine 1. The cooling fan 15 is connected to the crankshaft of the engine 1 and rotates at the same speed as that of the revolution of the engine 1. The air generating by the cooling fan 15 is effectively guided to a heat generating portion of the engine 1 such as the cylinder, and cools the engine 1.

In the present embodiment, the shape of a portion of the fan case 6 (one example of a fan cover) covering the cooling fan 15 is modified such that a portion of the cooling air generated by the cooling fan 15 is introduced into the muffler cover 2. To this end, an opening 6a is formed at a portion of the inner wall of the fan case 6, and the cooling-air introduction passage 8 is formed on the outside of the opening 6a, such that the cooling air exhausted from the opening 6a flows in a desired direction, e.g., a direction in which the cooling air comes into contact with the muffler 9. Muffler cooling air CA is introduced from the cooling-air introducing passage 8 into the inner space of the muffler cover 2, and uniformly flows along the outline (the front surface, the right side, the rear surface, the top surface, and the bottom surface) of the muffler 9, so as to be able to efficiently take heat from the muffler 9. In this way, partial air is introduced as the muffler cooling air CA into the cooling passage 13 through the cooling-air introducing passage 8 provided at the fan case 6. Therefore, it is possible to forcedly cool the muffler 9.

Figure 5:
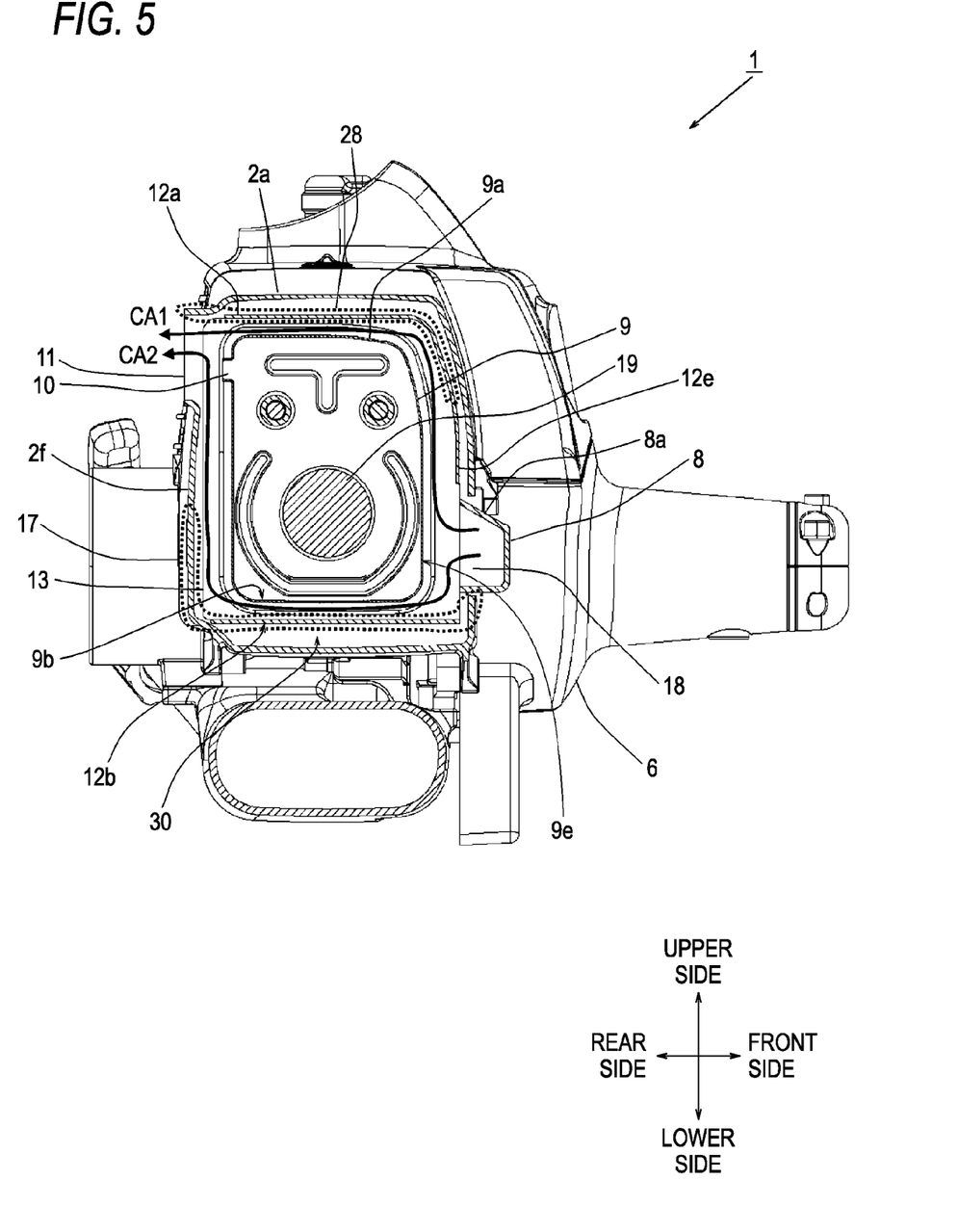
FIG. 5 is a cross-sectional view taken along a line A-A of FIG. 1 and shows a flow of muffler cooling air during operation of the engine.

FIG. 5 is a cross-sectional view taken along a line A-A of FIG. 1 and illustrates a flow of the muffler cooling air during operation of the engine. At the muffler accommodating chamber 30, the exhaust fume outlet 10 is disposed in the vicinity of the upper end of the cooling passage 13, and the cooling air outlet 11 is disposed on the extension thereof. A cooling air inlet 18 is below the cooling air outlet 11 as seen vertically and is disposed in the vicinity of the lower end of the cooling passage 13. The cooling air inlet 18 and the cooling air outlet 11 are disposed diagonally opposite to each other as seen from the vicinity of the center of the muffler 9. Due to this disposition, the cooling passage 13 is formed along a rear wall portion 2f of the muffler cover 2, a front wall portion 12e of the heat shield plate 12, the top wall portion 12a, the bottom wall portion 12b, and the right wall portion 2d of the muffler cover 2 (see FIG. 3). Therefore, if the cooling air flows in the cooling passage 13, it is possible to efficiently cool the almost entire surface except for a portion facing the cylinder side in the outline portion of the muffler 9. Also, a top wall 8a of the cooling air inlet of the cooling-air introducing passage 8 is formed to be inclined from bottom to top in the front to rear direction of the engine 8. In this way, a guiding portion for enabling the cooling air to easily flow in a predetermined direction is formed at the entrance to the passage. Further, at the cooling passage 13, a lower guiding portion 17 as shown by a dotted line is provided over the outer periphery of the lower portion including the cooling air inlet 18, and an upper guiding portion 28 as shown by a dotted line is provided over the outer periphery of the lower portion including the cooling air output 11.

Figure 6:
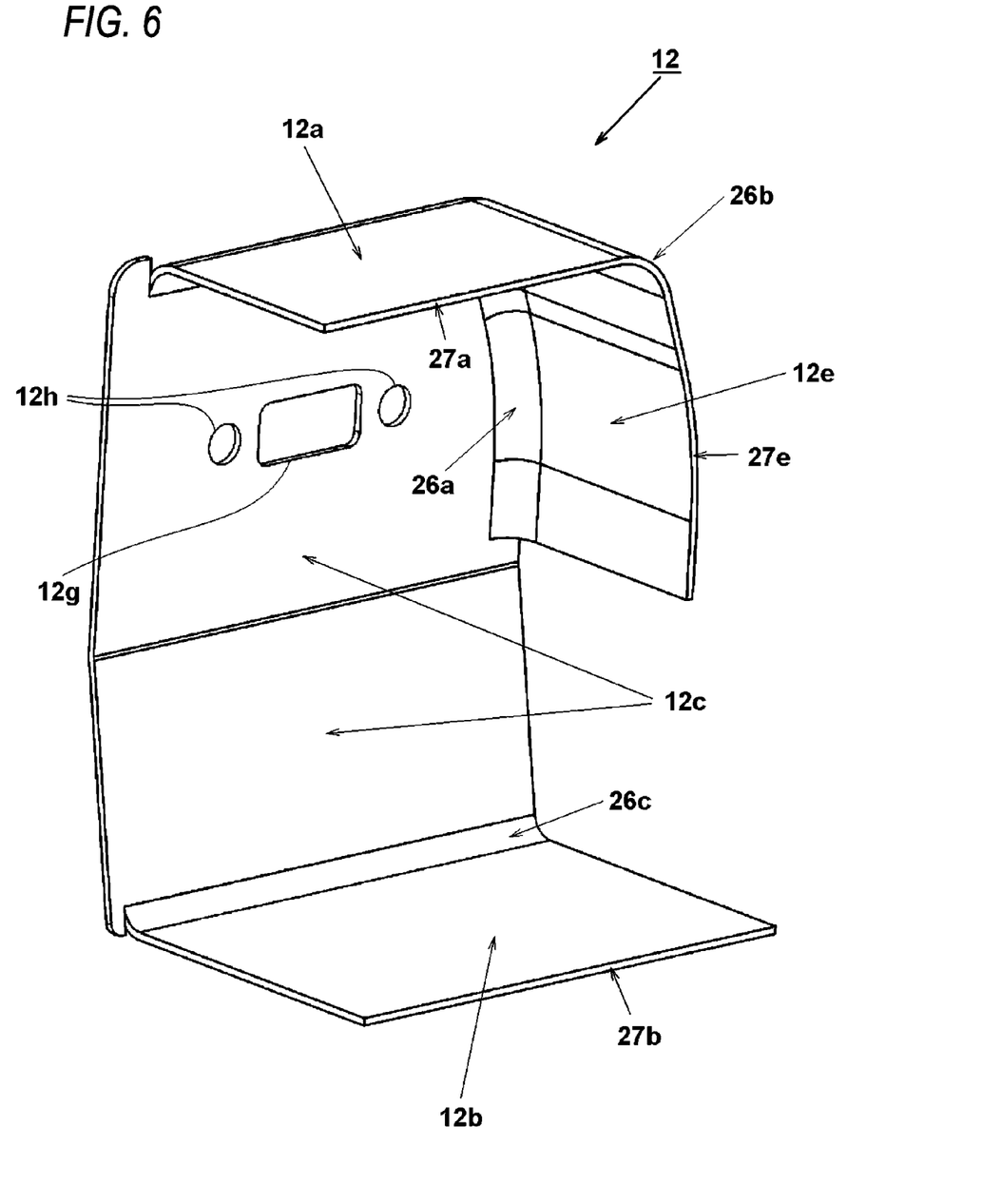
FIG. 6 is a perspective view illustrating the shape of a single heat shield plate of FIG. 3.

The lower guiding portion 17 is composed mainly of the rear wall portion 2f of the muffler cover 2 and a portion of the bottom wall portion 12b of the heat shield plate 12. Of them, the bottom wall portion 12b is configured in a plate shape without any opening as shown in FIG. 6, which will be described later. Therefore, it is possible to guide the cooling air flowing at the lower side of the cooling passage 13 along the outer periphery of the muffler without any leakage. Further, the rear wall portion 2f is also formed as a closed surface. Therefore, the cooling air introduced from the cooling-air introducing passage 8 is suppressed from being exhausted to the outside before reaching the cooling air outlet 11, and the cooling air guided by the bottom wall portion 12b is guided to change in the direction in the vicinity of a corner of the muffler 9 and flow along the upper side. The upper guiding portion 28 is also composed mainly of the front wall portion 12e and the top wall portion 12a which are formed as closed surfaces without any opening. Therefore, it is possible to smoothly guide the cooling air, and the cooling air flowing along the upper side at the vicinity of the corner is guided to flow toward the cooling air outlet 11. Incidentally, the closed surfaces of the lower guiding portion 17 and the upper guiding portion 28 may not need to be completely closed, as long as most of entering cooling air can be guided. For example, the closed surfaces of the lower guiding portion 17 and the upper guiding portion 28 may have minute small openings. Further, as shown in FIG. 4, since the right wall portion 2d is also configured as the almost closed surface, the cooling air flows toward the cooling air outlet 11 along the muffler 9.

In FIG. 5, the muffler cooling air CA collides with a side wall (front wall portion 9e) of the muffler 9 so as to be divided such that the muffler cooling air CA flows toward upper and lower sides of the muffler 9. Cooling air CA2 flowing at the lower side of the cooling passage 13 cools the bottom wall portion 9b of the muffler 9 by the lower guiding portion 17 formed according to the rear wall portion 2f of the muffler cover 2 and a portion of the bottom wall portion 12b of the heat shield plate 12. Then, the cooling air CA2 flows upward along the rear wall portion 2f and reaches the cooling air outlet 11. Meanwhile, muffler cooling air CA1 flowing upward from the cooling air inlet 18 along the front wall portion 12e of the heat shield plate 12 is guided by the upper guiding portion 28 formed by the front wall portion 12e and a portion of the top wall portion 12a and reaches the cooling air outlet 11. According to the above-described configuration, it is possible to surely guide the cooling air from the cooling air inlet 18 disposed at the lower end portion of the cooling passage 13 for the muffler 9 to the cooling air outlet 11 disposed at the upper end portion. Thus, it is possible to uniformly cool the muffler 9 over a wide range from the lower end to the upper end. Therefore, it is possible to achieve high efficiency of muffler cooling. Further, it is possible to suppress radiation heat of the muffler 9 from being transferred directly to the muffler cover 2 at a portion where the heat shield plate 12 is interposed between the muffler cover 2 and the muffler 9, and thus most of the cooling air CA1 and CA2 taking the waste heat of the muffler 9 does not come into direct contact with the muffler cover 2. Therefore, it is possible to significantly reduce a rise in the temperature of the muffler cover 2.

FIG. 6 is a perspective view illustrating the shape of the single heat shield plate 12. The heat shield plate 12 is formed by pressing a flat metal plate such as an iron plate with a heat insulating material applied thereon. When the muffler 9 is fixed to the cylinder by two fastening bolts 14, the fixing is performed with the heat shield plate 12 interposed between the muffler 9 and the cylinder such that the heat shield plate 12 is also fixed. To this end, the heat shield plate 12 has a substantially rectangular opening 12g which corresponds to the exhaust port (not shown) of the cylinder 16 and passes the exhaust fumes, and through-holes 12h for passing the fastening bolts 14 on both sides of the opening 12g. The heat shield plate 12 is interposed between the cylinder 16 and the muffler 9. The heat shield plate 12 has a function of making it difficult to transfer heat between the cylinder 16 and the muffler 9 and a function as a guiding portion (air guiding means) for guiding the cooling air to be supplied to the vicinity of the muffler 9 in a desired direction. For example, at the upper portion of the heat shield plate 12, the top wall portion 12a is formed to be bent at a right angle to a flat plate portion 12c, and at a front portion connected to the flat plate portion 12c and the top wall portion 12a, the front wall portion 12e is formed. The top wall portion 12a and the front wall portion 12e are formed in an arbitrary way. For example, a metal plate is pressed to be bent such that the top wall portion 12a and the front wall portion 12e are formed, and their edge portions can be bonded.

The front wall portion 12e is configured to extend from about the center of the upper half of the flat plate portion 12c. This is because the cooling air inlet 18 (see FIG. 5) is formed at the lower portion of the front wall portion 12e, and an opening is formed at a position of the heat shield plate 12 overlapping the cooling air inlet 18. Incidentally, the top wall portion 12a and the front wall portion 12e serves as a guiding portion for guiding the cooling air flowing in the muffler accommodating chamber 30 in a desired direction. Thus, it is preferable that the vicinity of an edge portion 26b to be bonded to a bent portion 26a is formed to have a gentle curvature.

On the other hand, at the lower portion of the heat shield plate 12, the bottom wall portion 12b is formed to be bent at a right angle from the flat plate portion 12c. This bent portion 26c is preferably formed in a smooth shape with a predetermined curvature so as not to block the flow of the cooling air. Here, edge portions 27a, 27b and 27e of the bent portions of the heat shield plate 12 are disposed to be fit into the grooves formed at the inner portion of the muffler cover 2. In this way, the heat shield plate 12 is disposed such that a portion protruding in a transverse direction (horizontal direction) from the flat plate portion 12c of the heat shield plate 12 comes into contact with the muffler cover 2. Therefore, it is possible to implement the cooling passage 13 for sufficiently guiding the cooling air in the muffler accommodating chamber 30 to the cooling air outlet 11.

Figure 7:
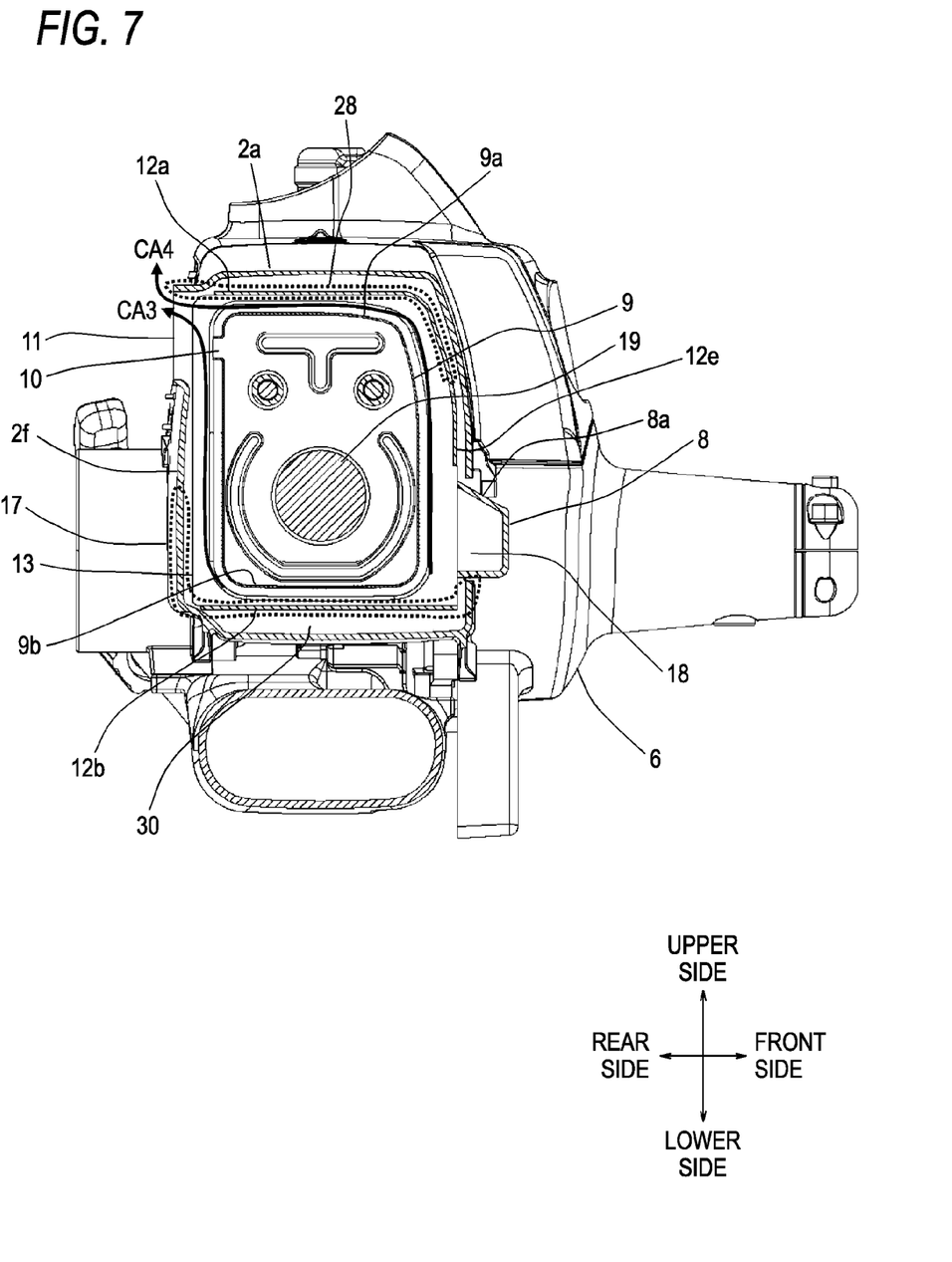
FIG. 7 is a cross-sectional view taken along the line A-A of FIG. 1, and shows a flow of natural air cooling during stop of the engine.

FIG. 7 is a cross-sectional view taken along the line A-A of FIG. 1, and shows a flow of natural air cooling during stop of the engine. When the engine stops, the rotation of the cooling fan 15 also stops, such that the flow of the cooling air into the muffler accommodating chamber 30 stops. Thus, the forced air cooling on the muffler 9 becomes difficult, and the muffler 9 is cooled by the natural air cooling like an engine 1. In the cooling passage 13 of the muffler cover 2, high-temperature updrafts CA3 and CA4 occur upward from the surface of the muffler 9. The updraft CA3 travels upward and is exhausted from the cooling air outlet 11, which is disposed at the upper end portion of the cooling passage 13, to the outside.

Also, the updraft CA4 travels upward, is guided to the cooling air outlet 11 by the upper guiding portion 28 formed by the top wall portion 12a and a portion of the front wall portion 12e of the heat shield plate 12, and is exhausted to the outside. In this case, since the updraft CA4 does not come into direct contact with the muffler cover 2 by virtue of the top wall portion 12a, it is possible to significantly reduce a rise in the temperature of the vicinity of the top wall portion 2a of the muffler cover 2. Further, since the cooling air inlet 18 is disposed below the cooling air outlet 11, i.e., at the lower end portion of the cooling passage 13, and since the top wall 8a of the cooling-air introducing passage 8 of the cooling passage 13 is configured to be inclined upward in the front to rear direction of the engine 8, the updrafts CA3 and CA4 rarely flow back to the cooling fan 15 side. Furthermore, since the longitudinal direction of the muffler 9 is oriented in the vertical direction to coincide with the direction of gravity, after the updraft CA4 farther from the cooling air outlet 11 reaches the top wall portion 12a which is the upper end of the cooling passage 13, the updraft CA4 can be quickly exhausted to the outside by a short path. Therefore, it is difficult for heat to be stay at the cooling passage 13.

As described above, according to the present embodiment, it is possible to efficiently shield the muffler cover 2 from the waste heat of the muffler while effectively cooling the muffler by both of the forced air cooling and the natural air cooling, and it is possible to prevent the muffler cover 2 from being heated.

In the present embodiment, at the muffler accommodating chamber 30 and the cooling passage 13, the cooling air outlet 11 is provided at a position corresponding to the exhaust fume outlet 10. However, the cooling air outlet 11 may be provided separately from the exhaust fume outlet 10. Also, a number of the cooling air outlet 11 may be not be limited to one, and a plurality of cooling air outlets may be provided. Further, in the present embodiment, at the muffler cover 2, only the cooling air outlet 11 is provided as a ventilator window. However, at other positions, additional ventilator windows may be provided, or slits may be provided. Furthermore, in the present embodiment, the cooling passage 13 is formed using the heat shield plate 12 and a wall surface of the muffler cover 2. However, the cooling passage 13 may be formed only by the heat shield plate 12, or the cooling passage 13 except for a top wall surface thereof may be formed only by the muffler cover.

Second Embodiment

Figure 8:
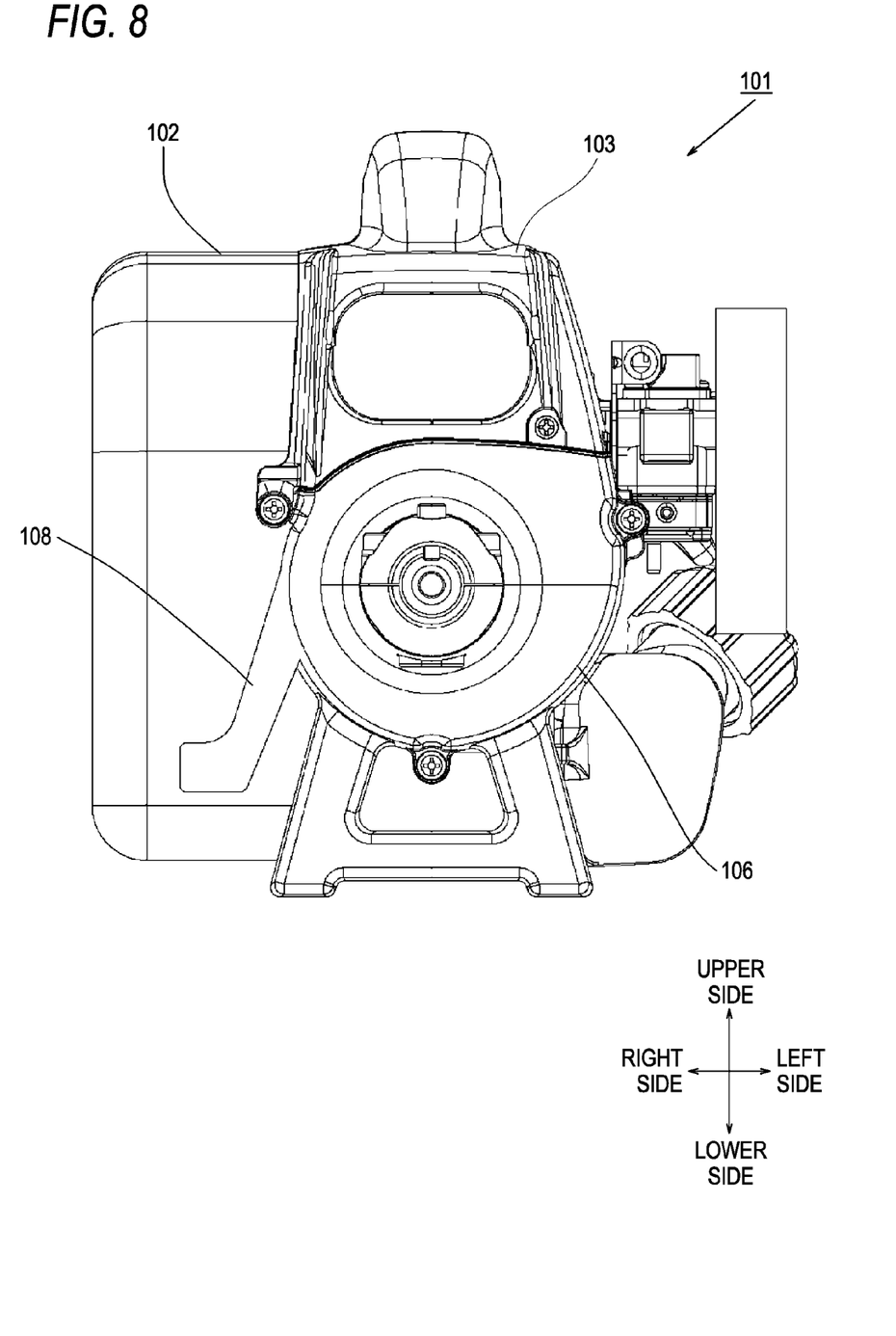
FIG. 8 is a front view illustrating an engine according to a second embodiment of the present invention.
Figure 9:
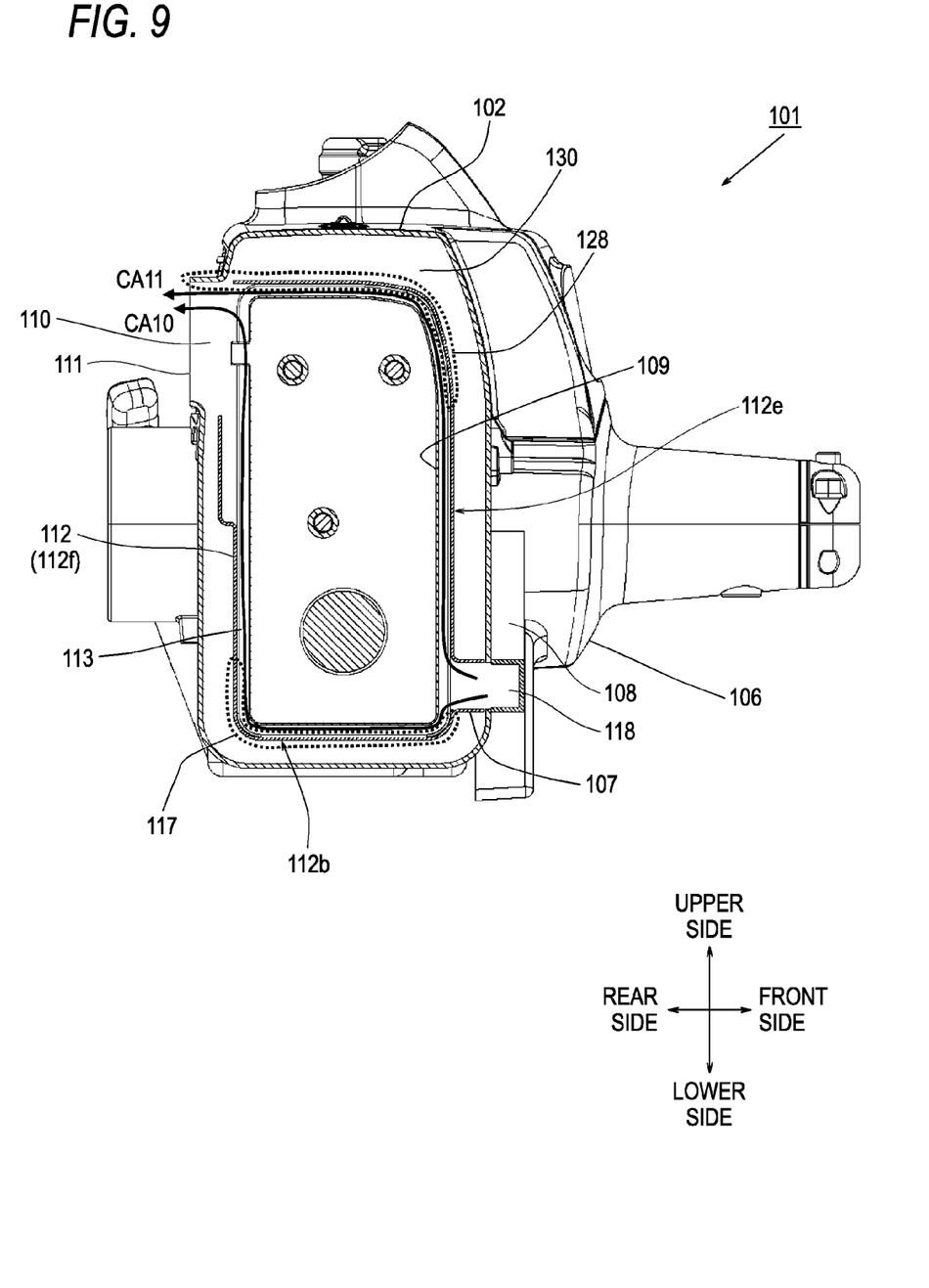
FIG. 9 is a cross-sectional view of the engine according to the second embodiment of the present invention taken along a line correspond to the line A-A of FIG. 1, and shows a flow of forced air cooling during operation of the engine.

Next, a second embodiment of the present invention will be described with reference to FIGS. 8 and 9. FIGS. 8 and 9 illustrate mainly a portion of the second embodiment with a large muffler attached thereto different from the first embodiment. FIG. 8 is a front view illustrating an engine 101 according to the second embodiment, and FIG. 9 is a longitudinal sectional view of the engine 101 according to the second embodiment (taken along a line corresponding to the line A-A of FIG. 1).

A cooling-air introducing passage 108 is formed at a fan case 106 to extend downward for introducing the cooling air to the lower end portion of a cooling passage 113. At a muffler accommodating chamber 130, a muffler 109 is surrounded by a heat shield plate 112, and the cooling passage 113 is formed at the gap between the muffler 109 and the heat shield plate 112 and the gap between the muffler 109 and a muffler cover 102. The shape of the heat shield plate 112 is a shape as extending the heat shield plate 12 shown in FIG. 6 in the longitudinal direction (vertical direction), so that the shape of the heat shield plate 112 according to the second embodiment may be similar to that of the heat shield plate 12 according to the first embodiment. However, the heat shield plate 112 is different from the heat shield plate 12 in that a front wall portion 112e has a shape similar to that of the heat shield plate 12 and extends downward up to the vicinity of the cooling-air introducing passage 108, and a rear wall portion 112f is provided. The rear wall portion 112f has a step-like portion to increase the gap between the muffler 109 and the rear wall portion 112f in the vicinity of a cooling air outlet 111. Further, in the vicinity of the lower end of the cooling passage 113, a portion of the heat shield plate 112 extends as a connection passage 107 so as to serve as a portion of the cooling-air introducing passage 108. The connection passage 107 is formed to be connected with a cooling air inlet 118.

According to the above-described configuration, the cooling air ejected from the cooling fan 15 is introduced from the vicinity of the lower end portion of the cooling passage 113 through the cooling-air introducing passage 108 and the connection passage 107. As shown in FIG. 9, the cooling air introduced into the cooling passage 113 through the connection passage 107 during operation of the engine collides with a wall surface of the muffler 109, so as to be divided into cooling air CA10 to travel downward and cooling air CA11 to travel upward. The cooling air CA10 traveling downward cools the lower end of the muffler 109, is guided upward by a lower guiding portion 117, flows at the upper side, and reaches the cooling air outlet 111. The cooling air CA11 traveling upward flows at the upper side and is guided to the cooling air outlet 111 by an upper guiding portion 128.

Therefore, even in a case where the muffler 109 is large, it is possible to uniformly cool the muffler 109 from the lower end to the upper end, and to achieve high cooling efficiency. Also, since the heat shield plate 112 makes it possible to suppress radiant heat of the muffler 109 from being transferred directly to the muffler cover 102, it is possible to reduce a rise in the temperature of the muffler cover 102.

Although the present invention has been described on the basis of the embodiments, the present invention is not limited by the above-described embodiments, but may be variously changed without departing from the scope of the present invention. For example, as a means to extend the cooling-air introducing passage to the lower end, the shape of a portion of the fan case is changed to extend the passage. Alternatively, an introducing passage may be formed by providing a separate and dedicated component. Also, as the connection passage is provided in the muffler accommodating chamber, the cooling-air introducing passage or a portion or the whole of the cooling air inlet may be accommodated in the muffler accommodating chamber. Although the above-described embodiments have been described on the basis of the engine 1 applied to a bush cutter, the engine-operated working machine may not be limited to the bush cutter, and may be other arbitrary engine-operated working machines such as chainsaws, blowers, and lawn mowers.

This application claims the benefit of Japanese Patent Application No. 2011-206674 filed on Sep. 21, 2011, the disclosure of which is incorporated herein in its entirety by reference.

INDUSTRIAL APPLICABILITY

As described above, an engine-operated working machine according to the invention has advantages of capable of efficiently shielding the muffler cover from the waste heat of a muffler while effectively cooling the muffler by both of forced air cooling and natural air cooling. The invention is useful for the engine-operated working machine, for example.

REFERENCE SIGNS LIST

1 Engine
2 Muffler cover
2a Top wall portion
2b Bottom wall portion
2d Right wall portion
2f Rear wall portion
3 Cylinder cover
3a Opening (of the cylinder cover)
4 Carburetor
5 Air cleaner
6 Fan case
6a Opening
7 Fuel tank
7a Cap
8 Cooling-air introduction passage
8a Top wall of cooling air inlet
9 Muffler
9a Top wall portion
9b Bottom wall portion
9d Outer wall portion
9e Front wall portion
10 Exhaust fume outlet
11 Cooling air outlet
12 Heat shield plate 12a Top wall portion
12b Bottom wall portion
12c Flat plate portion
12e Front wall portion
12h Through hole
12g Opening
13 Cooling passage
14 Fastening bolt
15 Cooling fan
16 Cylinder
17 Lower guiding portion
18 Cooling air inlet
19 Catalyst
22 Partition plate
27a, 27b, 27e Edge portion (of heat shield plate)
28 Upper guiding portion
30 Muffler accommodating chamber
31 Starter
32 Knob
101 Engine
102 Muffler cover
106 Fan case
107 Connection passage
108 Cooling-air introducing passage
109 Muffler
110 Exhaust fume outlet
111 Cooling air outlet
112 Heat shield plate
113 Cooling passage
117 Lower guiding portion
118 Cooling air inlet
128 Upper guiding portion
130 Muffler accommodating chamber
G Flow of exhaust fume
CA1 to CA11 Flow of air

The invention claimed is:

1. An engine comprising:
a cylinder having a plurality of fins at an outer circumference thereof and forming a combustion chamber;
a cooling fan, which is provided at one end of a drive shaft, and which is configured to cool the cylinder;
a muffler attached to an exhaust port of the cylinder; and
a muffler cover, which covers the muffler, and which forms a muffler accommodating chamber, wherein the muffler cover comprises a cooling air inlet and a cooling air outlet, and a part of cooling air generated by the cooling fan is introduced from the cooling air inlet into the muffler accommodating chamber so as to cool the muffler, wherein:
the engine comprises a heat shield plate interposed between the muffler and the muffler cover; and
the heat shield plate is provided with a top wall portion that extends between a top wall portion of the muffler and a top wall portion of the muffler cover, and configured to allow the cooling air from the cooling air inlet to flow between the muffler and the heat shield plate.

2. The engine according to claim 1, wherein:
the cooling air outlet is provided in a vicinity of an upper end of the muffler accommodating chamber such that a flow of natural air cooling during stop of the engine is configured to be discharged from the cooling air outlet to an outside; and
the cooling air inlet is disposed below the cooling air outlet.

3. The engine according to claim 1, wherein:
the cooling air outlet is provided in a vicinity of an upper end of the muffler accommodating chamber; and
the cooling air inlet is provided to the muffler accommodating chamber at a position diagonally to the cooling air outlet and is configured to allow the part of the cooling air introduced into the muffler accommodating chamber to cool the lower portion of the muffler and to flow to the cooling air outlet.

4. The engine according to claim 1, further comprising:
a fan cover that covers the cooling fan,
wherein the fan cover is configured to form a guiding passage for guiding the cooling air to the muffler accommodating chamber.

5. The engine according to claim 1, wherein the heat shield plate is provided between the muffler and the cylinder and has an area larger than that of a side portion of the muffler facing the cylinder.

6. The engine according to claim 5, wherein:
the top wall portion of the heat shield plate is configured to guide the cooling air reaching an upper side of the cooling passage to the cooling air outlet.

7. The engine according to claim 6, wherein:
the heat shield plate comprises a bottom wall portion that extends to be interposed between a bottom wall portion of the muffler and a bottom wall portion of the muffler cover; and
the bottom wall portion of the heat shield plate is configured to guide the cooling air flowing at a lower side of the cooling passage to the cooling air outlet.

8. The engine according to claim 7, wherein the muffler cover is configured such that the cooling air outlet becomes a single opening at a wall portion of the muffler accommodating chamber where the cooling air outlet is positioned.

9. The engine according to claim 8, wherein the top wall portion and the bottom wall portion of the heat shield plate are configured to abut on an inner wall of the muffler cover.

10. An engine-operated working machine comprising:
the engine according to claim 1.

11. An engine comprising:
a cylinder having a plurality of fins at an outer circumference thereof and forming a combustion chamber;
a cooling fan, which is provided at one end of a drive shaft, and which is configured to cool the cylinder;
a muffler attached to an exhaust port of the cylinder; and
a muffler cover, which covers the muffler, and which forms a muffler accommodating chamber, wherein the muffler cover comprises a cooling air inlet and a cooling air outlet, and a part of cooling air generated by the cooling fan is introduced from the cooling air inlet into the muffler accommodating chamber so as to cool the muffler, wherein:
the engine comprises a heat shield plate interposed between the muffler and the muffler cover; and
the heat shield plate is provided with a bottom wall portion that extends between a bottom wall portion of the muffler and a bottom wall portion of the muffler cover, and configured to allow the cooling air from the cooling air inlet to flow between the muffler and the heat shield plate.

12. An engine-operated working machine comprising:
the engine according to claim 11.

* * * * *